May 22, 1923.

E. J. KRPATA

VEHICLE WHEEL

Filed April 18, 1922    2 Sheets-Sheet 1

WITNESSES

INVENTOR
E. J. Krpata
BY
ATTORNEYS

May 22, 1923.

E. J. KRPATA

VEHICLE WHEEL

Filed April 18, 1922

WITNESSES

INVENTOR
E. J. Krpata
BY
ATTORNEYS

Patented May 22, 1923.

1,456,451

UNITED STATES PATENT OFFICE.

EDWARD JOSEPH KRPATA, OF HIGGANUM, CONNECTICUT.

VEHICLE WHEEL.

Application filed April 18, 1922. Serial No. 554,843.

*To all whom it may concern:*

Be it known that I, EDWARD J. KRPATA, a citizen of the United States, and a resident of Higganum, in the county of Middlesex and State of Connecticut, have invented new and useful Improvements in Vehicle Wheels, of which the following is a full, clear, and exact description.

This invention relates to vehicle wheels which are provided with demountable rims.

The general object of this invention is the provision of a device for use in conjunction with a vehicle wheel carrying a demountable rim to normally retain the demountable rim in position and which may be quickly and easily operated to release the demountable rim when it is necessary to remove it from the wheel.

This object is accomplished by providing on the wheel a plurality of latches which may be operated by cam means to engage the demountable rim to retain it in position.

With the above and other objects in view the invention consists in details of construction and in the arrangement and combination of parts to be hereinafter more fully described and particularly pointed out in the appended claims.

In describing the invention reference will be had to the accompanying drawings, in which Figure 1 is a side elevation showing the means associated with the vehicle wheel to enclose the device;

Figure 1:
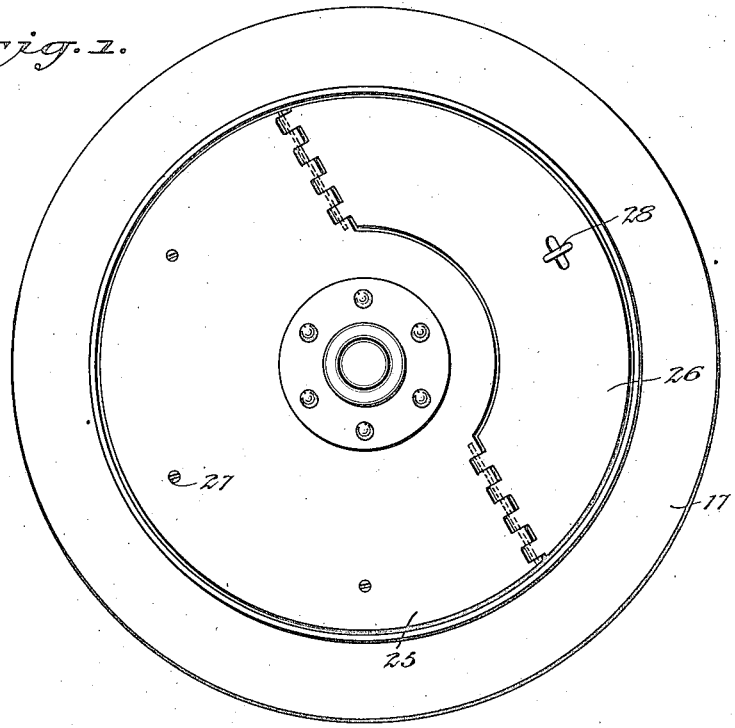

Referring to the above-mentioned drawings, a wheel assemblage, including a hub 10, a wheel web 11, a rim 12 provided with an annular flange 13, and bracing members 14, is shown mounted on an axle 15. A demountable rim 16 carrying a tire 17 is mounted on the rim 12 of the wheel assemblage.

The device which serves to retain the demountable rim in position on the wheel rim is attached to the wheel structure set forth and will be described in detail in the following paragraph:

Slidably mounted in grooves 19 formed in the wheel web 11 are a plurality of latches 18. These latches as mounted move in radial lines. Plates 20 attached to the wheel web 11 serve to retain the latches 18 in position in the grooves. Each latch 18 is provided with a head 21 which projects above the face of the wheel web 11. Springs 22 are located between the heads of the latches 18 and the plates 20 and serve to force the latches 18 radially inward when their operating means has been released therefrom. A cam wheel 23 is rotatably mounted on the wheel assemblage and retained in position by a disk 24. This cam wheel lies in the same plane with the latches 18 and serves as a means for forcing the latches radially inward. A cover 25 provided with a hinged door 26 is attached to the wheel structure by screws 27. The door 26 of the cover 25 is retained closed by the latch 28. Bolts 29 project through the cover 25 and the disk 24 into the wheel web 11 and serve to retain the members in position.

The demountable rim 16 has a plurality of notches 30 cut therein to receive the latches 18. These notches 30 would be spaced around the demountable rim at the same intervals that the latches are spaced on the wheel web. Thus when the demountable rim is properly position on the wheel rim 12 the notches lie in alinement with the latches 18.

The cam wheel 23 has attached thereto by means of supports 32 a rack 33. Mounted on the wheel web 11 is a lug 34. A dog 35 is pivotally attached to this lug so as to lie in alinement with the rack 33, and a spring 36 is associated with the dog to normally retain the dog 35 in engagement with the rack 33.

Figure 2:
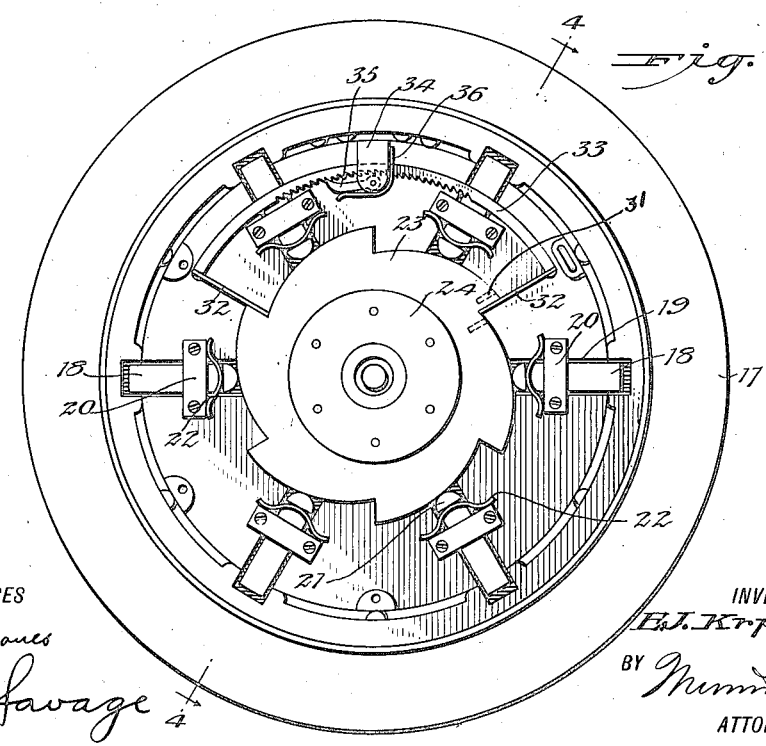
Figure 2 is a side elevation of the vehicle wheel with the device mounted thereon and the cover removed to show the details of construction.
Figure 4:
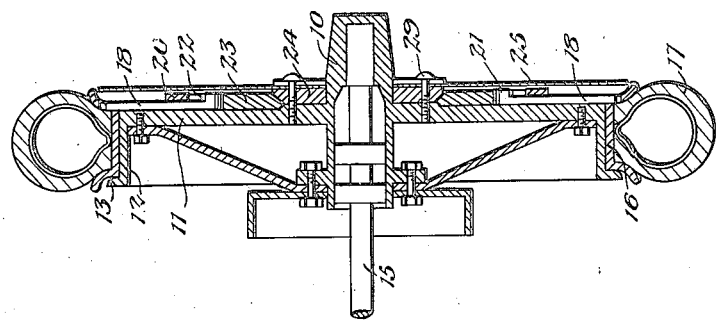
Figure 4 is a section along the line 4—4, Figure 2, showing the internal structure of the wheel.
Figure 3:
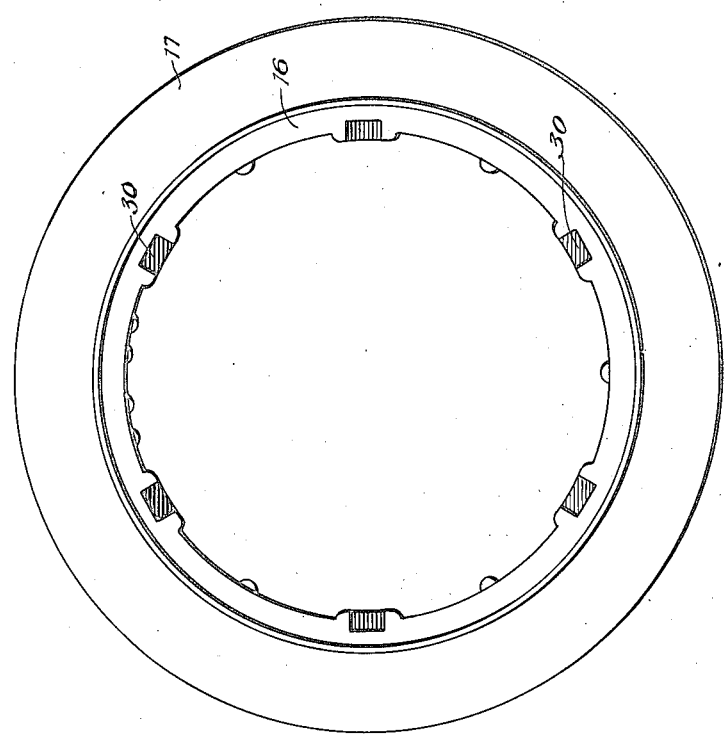
Figure 3 is a side elevation of the demountable rim showing the notches cut therein to allow the latches to engage the rim.

Let the device be considered as shown in Figure 4 with the latches forced outward, retaining the demountable rim 16 in position on the wheel assemblage. Then in order to remove the demountable rim the cam wheel 23 is rotated clockwise as viewed in Figure 2 by means of a wrench or any other device for engaging in the openings 31 in the cam wheel 23. This releases the pressure of the cam wheel on the latches 18 and they are moved radially inward by means of the springs 22 thus removing them from engagement with the demountable rim 16. After this operation the demountable rim may be withdrawn from the wheel assemblage. In mounting the demountable rim on the wheel it is first placed in position and then the cam wheel 23, as viewed in Figure 2, is rotated counter-clockwise, forcing the latches radially outward into the notches 30, the rim thus engaging it and retaining it firmly in position on the wheel. The cover 25 serves as a means to protect the moving parts of the device.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A device of the class described for locking demountable rims on wheel structures, comprising a plurality of latches slidably mounted on the wheel structure, a spring associated with each latch for normally retaining it out of engagement with the demountable rim, a cam rotatably mounted on the wheel structure and co-operating with the latches for forcing them into engagement with the demountable rim, and means carried by the cam for engaging with means carried by the wheel structure to retain the cam in different positions.

2. In combination with a wheel structure carrying a demountable rim, a device of the class described for retaining the demountable rim in position, comprising latches slidably mounted on the wheel structure and movable along radial lines to engage the demountable rim, cam means rotatably mounted on the wheel structure for co-operating with the latches to move them into engagement with the demountable rim, spring means associated with each latch for withdrawing it from engagement with the demountable rim when the latches are released from the cam means, a rack attached to the cam means and a dog carried by the wheel structure for associating with the said rack to lock the cam means in different positions.

3. In combination with a wheel structure carrying a demountable rim, a device of the class described for retaining the demountable rim in position, comprising latches slidably mounted on the wheel structure and movable along radial lines to engage the demountable rim, cam means rotatably mounted on the wheel structure for co-operating with the latches to move them into engagement with the demountable rim, spring means associated with each latch for withdrawing it from engagement with the demountable rim when the latches are released from the cam means, a rack attached to the cam means, a dog carried by the wheel structure for associating with said rack to lock the cam means in different positions, and a casing for attaching to a wheel structure to enclose the moving parts, said casing being provided with a hinged door.

EDWARD JOSEPH KRPATA.